(12) United States Patent
Ciancio-Bunch

(10) Patent No.: US 9,338,121 B2
(45) Date of Patent: May 10, 2016

(54) SYSTEM AND METHOD FOR MANAGING A MESSAGING CAMPAIGN WITHIN AN ENTERPRISE

(75) Inventor: James Michael Ciancio-Bunch, Indianapolis, IN (US)

(73) Assignee: EXACTTARGET, INC., Indianapolis, IN (US)

( * ) Notice: Subject to any disclaimer, the term of this patent is extended or adjusted under 35 U.S.C. 154(b) by 152 days.

(21) Appl. No.: 13/701,676

(22) PCT Filed: Jun. 6, 2011

(86) PCT No.: PCT/US2011/039340
§ 371 (c)(1),
(2), (4) Date: Feb. 15, 2013

(87) PCT Pub. No.: WO2011/153550
PCT Pub. Date: Dec. 8, 2011

(65) Prior Publication Data
US 2013/0139069 A1 May 30, 2013

Related U.S. Application Data

(60) Provisional application No. 61/351,673, filed on Jun. 4, 2010.

(51) Int. Cl.
*G06F 3/00* (2006.01)
*G06Q 30/02* (2012.01)
*H04L 12/58* (2006.01)

(52) U.S. Cl.
CPC ........ *H04L 51/32* (2013.01); *G06F 3/00* (2013.01); *G06Q 30/02* (2013.01); *G06Q 30/0251* (2013.01)

(58) Field of Classification Search
None
See application file for complete search history.

(56) References Cited

U.S. PATENT DOCUMENTS

| 6,400,958 B1 * | 6/2002 | Isomursu et al. ............. 455/466 |
| 7,275,083 B1 * | 9/2007 | Seibel et al. .................. 709/206 |
| 8,156,098 B1 * | 4/2012 | Landsman et al. ............ 707/706 |
| 8,706,552 B1 * | 4/2014 | Benjamin et al. .......... 705/14.58 |

(Continued)

FOREIGN PATENT DOCUMENTS

| JP | 2003099364 A | 4/2003 |
| JP | 2004295707 A | 10/2004 |

(Continued)

OTHER PUBLICATIONS

Salesforce, "How to be Successful with Salesforce," Sep. 8, 2009, http://www.data-force.com/static/df4/files/SF-UserGuide.pdf.*

(Continued)

*Primary Examiner* — Ryan Barrett
(74) *Attorney, Agent, or Firm* — Morris & Kamlay LLP

(57) ABSTRACT

A method and system for managing a messaging campaign within an enterprise are disclosed. Such a method includes generating with a server a user interface, the interface being configured to allow a user to select a recipient list based upon one or more contextual attributes stored in a database, wherein the contextual attributes are based upon the interaction of one or more recipients with external systems. The method also includes selecting a recipient list using the user interface based upon a set of contextual attributes, generating electronic messages within a message campaign, and sending the electronic messages to recipients on the recipient list.

23 Claims, 5 Drawing Sheets

(56) References Cited

U.S. PATENT DOCUMENTS

| | | | |
|---|---|---|---|
| 2002/0046099 A1* | 4/2002 | Frengut et al. | 705/14 |
| 2002/0083138 A1* | 6/2002 | Wilson et al. | 709/206 |
| 2002/0087335 A1* | 7/2002 | Meyers et al. | 705/1 |
| 2002/0087397 A1* | 7/2002 | Mazza | 705/14 |
| 2002/0094868 A1* | 7/2002 | Tuck et al. | 463/42 |
| 2002/0166119 A1* | 11/2002 | Cristofalo | 725/34 |
| 2004/0073482 A1* | 4/2004 | Wiggins et al. | 705/14 |
| 2004/0133480 A1* | 7/2004 | Domes | 705/26 |
| 2005/0228824 A1* | 10/2005 | Gattuso et al. | 707/104.1 |
| 2005/0261928 A1* | 11/2005 | Skeadas | 705/1 |
| 2006/0074769 A1* | 4/2006 | Looney et al. | 705/26 |
| 2006/0206834 A1* | 9/2006 | Fisher et al. | 715/777 |
| 2007/0027762 A1* | 2/2007 | Collins et al. | 705/14 |
| 2007/0121843 A1* | 5/2007 | Atazky et al. | 379/114.13 |
| 2007/0266321 A1* | 11/2007 | Bicker et al. | 715/713 |
| 2008/0082394 A1* | 4/2008 | Floyd et al. | 705/10 |
| 2008/0103875 A1* | 5/2008 | Kokernak et al. | 705/10 |
| 2008/0109285 A1* | 5/2008 | Reuther et al. | 705/7 |
| 2008/0109304 A1* | 5/2008 | Sarelson et al. | 705/14 |
| 2008/0147810 A1 | 6/2008 | Kumar et al. | |
| 2008/0178073 A1* | 7/2008 | Gao et al. | 715/243 |
| 2008/0195468 A1* | 8/2008 | Malik | 705/14 |
| 2008/0288310 A1* | 11/2008 | Aaltonen et al. | 705/7 |
| 2008/0301237 A1 | 12/2008 | Parsons et al. | |
| 2008/0313010 A1* | 12/2008 | Jepson et al. | 705/10 |
| 2008/0318559 A1* | 12/2008 | Porco | 455/414.2 |
| 2009/0030775 A1* | 1/2009 | Vieri | 705/10 |
| 2009/0055267 A1* | 2/2009 | Roker | 705/14 |
| 2009/0063274 A1* | 3/2009 | Dublin et al. | 705/14 |
| 2009/0077163 A1* | 3/2009 | Ertugrul et al. | 709/203 |
| 2009/0089654 A1* | 4/2009 | Wittig et al. | 715/223 |
| 2009/0157693 A1 | 6/2009 | Palahnuk | |
| 2009/0165090 A1 | 6/2009 | Glasgow | |
| 2009/0186635 A1* | 7/2009 | Vieri | 455/466 |
| 2009/0197582 A1* | 8/2009 | Lewis et al. | 455/414.2 |
| 2009/0216682 A1* | 8/2009 | Foladare et al. | 705/80 |
| 2009/0221280 A1 | 9/2009 | Mitelberg | |
| 2009/0234717 A1* | 9/2009 | Wiggins et al. | 705/10 |
| 2009/0234876 A1 | 9/2009 | Schigel et al. | |
| 2009/0241035 A1* | 9/2009 | Tseng et al. | 715/753 |
| 2010/0041422 A1* | 2/2010 | Wormald et al. | 455/466 |
| 2010/0057872 A1 | 3/2010 | Koons et al. | |
| 2010/0131365 A1* | 5/2010 | Subramanian et al. | 705/14.55 |
| 2010/0162137 A1* | 6/2010 | Ganz et al. | 715/757 |
| 2010/0250351 A1* | 9/2010 | Gillenson et al. | 705/14.13 |
| 2010/0250368 A1* | 9/2010 | Porco | 705/14.58 |
| 2010/0274645 A1* | 10/2010 | Trevithick et al. | 705/14.5 |
| 2010/0274652 A1* | 10/2010 | Carlson | 705/14.25 |
| 2010/0312706 A1* | 12/2010 | Combet et al. | 705/50 |
| 2011/0016479 A1* | 1/2011 | Tidwell et al. | 725/9 |
| 2011/0113071 A1* | 5/2011 | Lee et al. | 707/802 |
| 2011/0145719 A1* | 6/2011 | Chen et al. | 715/739 |
| 2011/0307695 A1* | 12/2011 | Slater | 713/163 |
| 2012/0059906 A1* | 3/2012 | Ciancio-Bunch et al. | 709/217 |
| 2012/0143662 A1* | 6/2012 | Heath | 705/14.5 |

FOREIGN PATENT DOCUMENTS

| | | |
|---|---|---|
| WO | 03081441 A1 | 10/2003 |
| WO | 2008137160 A1 | 11/2008 |

OTHER PUBLICATIONS

Bennett, "HootSuite Announces New Features, Including Klout Integration. Is This (Almost) the Perfect Twitter Client?," Feb. 16, 2010, http://www.adweek.com/socialtimes/hootsuite-klout/447033.*

Clint3000, "Klout + Salesforce Mashup," May 17, 2011, http://developer.force.com/codeshare/project/klout-salesforce-mashup.*

PCT/US2011/039340 International Searching Authority, Written Opinion of the International Searching Authority, Sep. 8, 2011.

PCT/US2011/039340 International Searching Authority, International Search Report, Sep. 8, 2011.

Japanese Office Action dated May 1, 2015 issued in JP Application No. 2013-513415.

"Japanese Notice of Allowance issued on Aug. 10, 2015 in corresponding Japanese Application No. 2013-513415."

* cited by examiner

SYSTEM AND METHOD FOR MANAGING A MESSAGING CAMPAIGN WITHIN AN ENTERPRISE

PRIORITY

The present application is related to, and claims the priority benefit of, International Patent Application Serial No. PCT/US2011/039340, filed Jun. 6, 2011, which is related to, and claims the priority benefit of U.S. Provisional Patent Application Serial No. 61/351,673, filed Jun. 4, 2010. The contents of each of these applications are hereby incorporated by reference in their entirety into this disclosure.

BACKGROUND

Many corporations, associations, groups, franchisors and other entities, referred to generally as enterprises, send communications to persons who have or might have an interest in receiving communications from such enterprises. Not all organizational units of an enterprise have the same need, desire or entitlement to access information regarding any individual person. For instance, an organizational unit that has developed a customer relationship and obtained permission to send correspondence (e.g., emails) from a campaign to an individual would have a different level of need, desire or entitlement to access information regarding that individual than another business unit within the enterprise that has had no past dealings and is unlikely to have future dealings with the individual. The systems used by enterprises today to manage subscriber information and send communications provide some security protections but fail to provide a user with the ability to take full advantage of subscriber information. In fact, the systems used today tend to require a user to utilize a script or other burdensome activity. According, there exists a need for a system and method for subscriber management that provides security measures and dynamic information for maximizing the benefit of electronic communication campaigns.

BRIEF DESCRIPTION OF THE DRAWINGS

The features and advantages of this disclosure, and the manner of attaining them, will be more apparent and better understood by reference to the accompanying drawings, wherein.

DETAILED DESCRIPTION

Figure 1:
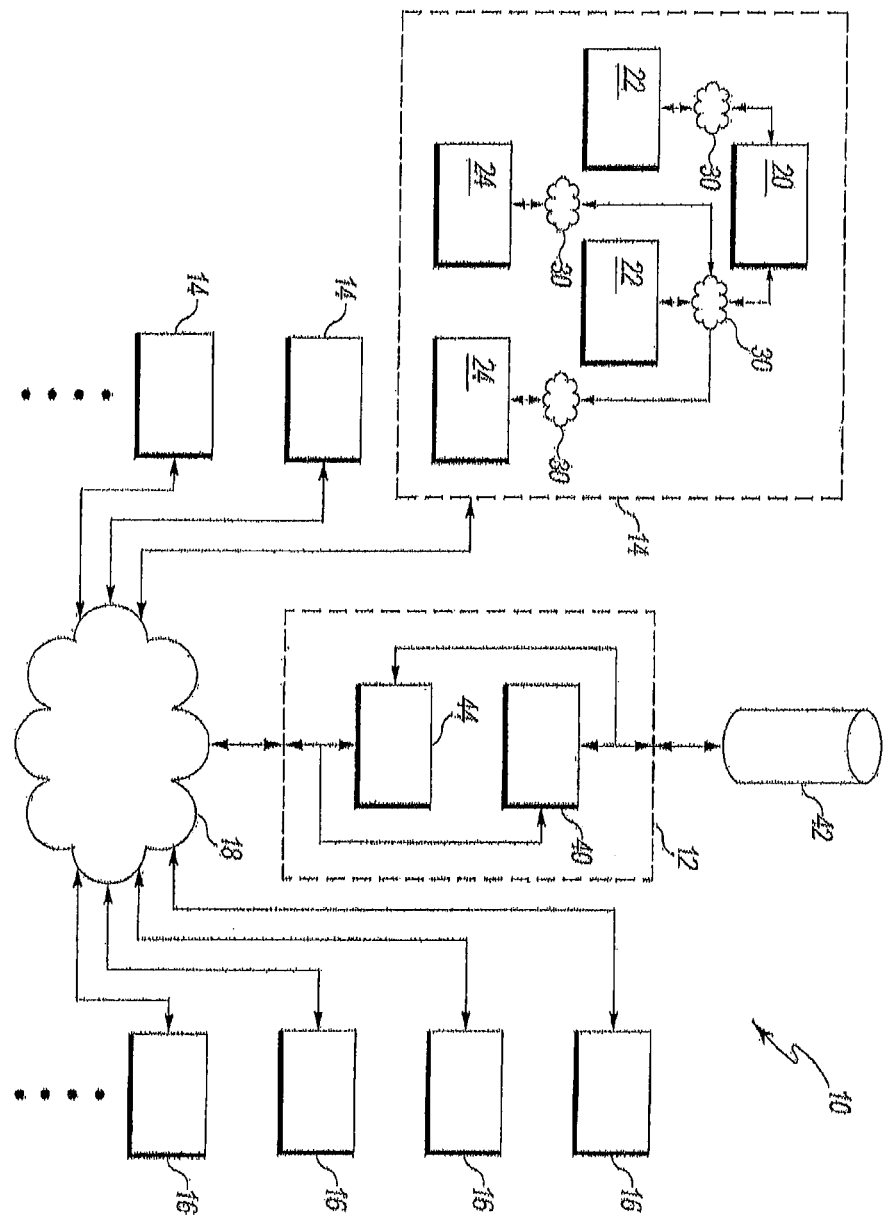
FIG. 1 shows a system for managing a messaging campaign within an enterprise according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The system and method of the present disclosure provide subscriber management based around attributes within a context, access control of subscriber information of an enterprise, and the ability to send communications to subscribers where the subscribers are selected based upon attributes within a context. The system and method of the present disclosure manage attributes through contexts and can send electronic messages to recipients based upon the selection of an attribute or attributes within the contexts.

While at times described generally with reference to one-to-one marketing and email campaigns, the system and method of the present disclosure is applicable for use with all forms of electronic messages, including, but not limited to, email, sms, mms, voice, and social postings. Also, while the term "subscriber" is used herein, it should be understood that such term, unless otherwise specifically indicated should not be viewed as limiting, but includes all types of recipients or potential recipients of electronic messages.

FIG. 1 shows one embodiment of a system for managing a messaging campaign within an enterprise 10 according to the present disclosure. As shown in FIG. 1, the system 10 may include an electronic message provider (e.g., email service provider (ESP) system) 12, one or more enterprise systems 14, a plurality of recipient devices 16, and a network 18.

Each enterprise system 14 is typically a computer system or network of computer systems including enterprise level devices 20, second tier devices 22 and third tier devices 24 accessible by differing business units of an enterprise. The enterprise system 14 may include one or more networks 30, which may be, for example, a proprietary local area network (LAN), a wide area network (WAN), or a public cloud based network.

Enterprise level devices 20, second tier devices 22, third tier devices 24 and the plurality of recipient devices 16 may be computers, computing devices, or systems of a type well known in the art, such as a mainframe computer, workstation, personal computer, laptop computer, hand-held computer, cellular telephone, or personal digital assistant. Enterprise level devices 20, second tier devices 22, third tier devices 24 and the plurality of recipient devices 16 may comprise such software, hardware, and componentry as would occur to one of skill in the art, such as, for example, one or more microprocessors, memory systems, input/output devices, device controllers, and the like. Typically, enterprise level devices 20, second tier devices 22, third tier devices 24 and the plurality of recipient devices 16 may also comprise one or more data entry means (not shown) operable by users of the same for data entry. For example, a pointing device (such as a mouse), keyboard, touchscreen, microphone, voice recognition, and/or other data entry means may be included. Enterprise level devices 20, second tier devices 22, third tier devices 24 and the plurality of recipient devices 16 may also comprise a display means which may comprise many of the well known display means such as, for example, cathode ray tube displays, liquid crystal diode displays, and light emitting diode displays, upon which information may be displayed in a manner perceptible to the user.

Typically, enterprise level devices 20, second tier devices 22 and third tier devices 24 communicate with each other via network 30. Enterprise level devices 20, second tier devices 22, third tier devices 24 and the plurality of recipient devices 16 may communicate with server 40 via computer network 18. In FIG. 1, computer network 30 and computer network 18 are shown as distinct computer networks. It should be noted, however, that computer networks 18 and 30 may comprise the same computer network. The communication between enterprise level devices 20, second tier devices 22, third tier devices 24 and the plurality of recipient devices 16 and server 40 may be bi-directional. Computer networks 18 and 30, or both, may comprise the Internet. It should be noted that various networks, such as Ethernet networks, cable-based networks, and satellite communications networks, well known in the art, and/or any combination of networks are contemplated to be within the scope of the disclosed system.

Server 40 may comprise one or more server computers, computing devices, or systems of a type known in the art. Typically, server 40 further comprises such software, hardware, and componentry as would occur to one of skill in the art, such as, for example, microprocessors, memory systems, input/output devices, device controllers, display systems, and the like. Server 40 may comprise one of many well known servers, such as, for example, IBM®'s AS/400® Server, IBM®'s AIX UNIX® Server, or a Windows Server. In FIG. 1, server 40 is shown and referred to herein as a single server. However, server 40 may comprise a plurality of servers or other computing devices or systems interconnected by hardware and software systems known in the art which collectively are operable to perform the functions allocated to server 40. As shown in FIG. 1, the server 40 may be communicatively coupled to the network 18 and configured to generate a user interface for presentation to devices of enterprise systems 14 such that a user may access and utilize the database (described below) and generally interact with other devices of the system to generate and send electronic communications.

The messaging engine 44 is configured to send messages (e.g., emails) for campaigns on behalf of enterprises to recipients. The messaging engine 44 and server 40 are configured to access memory 42 to store information regarding recipients of emails, email campaigns, enterprises and other relevant information in memory. In FIG. 1, a database (not shown) is implemented in memory 42 and associated with server 40. As shown in FIG. 1, the memory 42 is coupled to the server 40 so the database is also accessible to server 40. The database may also be associated with server 40 where the database resides on a server or computing device remote from server 40, where the remote server or computing device is capable of continuous bi-directional data transfer with server 40. The database retrievably stores information (e.g., attributes) that is communicated to the database from enterprise level devices 20, second tier devices 22, third tier devices 24 and the plurality of recipient devices 16 through computer network 18. Information related to all of the subscribers of the enterprise marketing campaigns may be stored in memory accessible to the enterprise level system, such as in the database of memory 42.

While the database referred to herein is a single database, it will be appreciated by those of ordinary skill in the art that the database may comprise a plurality of databases connected by software systems of a type well known in the art, which collectively are operable to perform the functions delegated to database according to the present disclosure. The database may comprise a relational database architecture or other database including columnar data stores, in memory data stores, and distributed data processing environment, such as, for example, Apache™ Hadoop™. The database may comprise one of many database management systems, such as, for example, MICROSOFT®'s SQL® Server, MICROSOFT®'s ACCESS®, or IBM®'s DB2® database management systems, or the database management systems available from ORACLE® or SYBASE®.

The more data that an enterprise collects about its subscribers, the more targeted and personalized the enterprise can make its communications with the subscribers. To help consolidate what an enterprise knows about its subscribers, various attributes can be created. For example, profile attributes can be created to manage demographic information, and preference attributes can be created to capture such information as the frequency with which the subscriber wants to receive information from the enterprise. Profile attributes offer great flexibility in allowing a variety of data to be captured and in controlling the type of data that is captured related to a subscriber. Once an enterprise has defined its attributes related to its subscribers, the enterprise can use the attributes to create groups and drive personalized and dynamic content.

According to the present disclosure, attributes generally represent information that is known about a person. Attributes can be relatively static like names, customer number, and hair color. Attributes can also be fleeting such as transaction ID, item shopped for, or name of the person challenging you to an online duel. Attributes may be populated from various data sources and may include various external sources (e.g., Klout score). Attributes may be embodied in various types, including XML and HTML.

Attributes can be defined at the enterprise level in the database. These attributes will apply to all persons contained within the enterprise other than ad hoc lists tied to specific data sources (e.g., an import from a file to support a one-time send). Business units can also define attributes that enhance those of the enterprise. Enterprises typically desire the flexibility to allow people imported into a business unit to be imported into the enterprise at the same time. The method and system of the present disclosure has devised a means of combining enterprise and business unit attributes within the context of a business unit so that they seem like a single set of attributes belonging to the business unit.

Attributes may have a simple set of required metadata, such as, for example, type, data length, default, and support for NULL values. Attributes may require a rich set of metadata to support advanced analysis and usability. The ability to categorize attributes is helpful in accounts that have a large attribute count. For example, data may be presented as a manageable list of user defined categories such as demographic, business, and personal. Users can then expand each of these categories to view the actual attributes (or perhaps more attribute categories).

According to the system and method of the present disclosure, the model implemented for managing attributes in the database is based around contexts. In the present disclosure, a context refers to a set of attributes that are made available to particular user(s). With contexts, users may effectively utilize the system to reach, send information to, or otherwise communicate with individuals using a variety of communication means without sacrificing the privacy of the individuals. For example, suppose user A is a salesperson of a car repair shop and user B is the owner of the car repair shop. The system may be arranged and contexts set such that when user A accesses the system, user A encounters a user interface that shows the following attributes: makes and models of cars, work that has been done on those cars, email addresses for those cars, and warranties for those cars. With this information, user A can send out electronic messages to the car owners regarding the upcoming termination of warranty information or need to replace a car part. User B may have a different context when it comes to the stored attributes. That is, when user B accesses the system, user B may encounter a user interface that shows all of the attributes that user A can see but also the payments made by each of the customers. With this information, user B may be able to send out electronic messages, including coupons, to the car owners that have spent the most money or least amount of money at the car repair shop. In other words, attributes of people may only be known under certain contexts. It should also be noted that attributes may have different values in different contexts.

The model for managing attributes in the database provides for an autoconfiguration. That is, attribute sets can be assigned to various users and sets of users. As discussed previously, this provides users with a simple and time efficient mechanism for accessing and utilizing the applicable attributes to generate and send electronic messages.

In the database, people (e.g., subscribers) represent the human beings that entities (e.g., companies) are trying to message or otherwise communicate. Addresses are the key to interacting with the people over some communication medium. Addresses include things such as, but not limited to, email addresses, cell phone numbers, Facebook® names, or phone numbers. A person can have no addresses or many addresses associated with him or her. For example, they might have an email address and a cell phone number to which SMS messages may be sent. A user can also have multiple addresses of the same kind. For example, Joe might have a work email address that would be tagged with "work" and a home email address tagged with "home". A user could target a send to Joe to either the home or work address. It should also be noted that addresses may be associated with no people or many people. As further discussed below, an address that is not associated with a person or people may eventually be associated with a person or people based upon activity of the address and the like.

In the database of the present disclosure, each person generally has a unique Person Key. A Person Key can be assigned by the user or assigned by the system. People who enter the system via Web Capture, MO, or Social Forwarding may generally require a system generated key. Over time, captured people may be identified as existing persons within the system. The system can allow users to assign a new key to the captured person and consolidate their history with the existing person (while providing some level of visibility to the earlier state).

In at least one embodiment of the present disclosure, the attributes in the database may be defined for people to describe where people reside, such as for geo-targeting. This could be done using user-defined attributes, but may be accomplished when the attributes are provided by the system. Some of the location specific attributes may be Zip Code, Country, City, State, Area Code, Latitude/Longitude and Locale. Typically, in order to support notifications and internal communication, each Business Unit should have a list that represents the users of that business unit.

In at least one embodiment of the present disclosure, the database may be configured for dimensional attributes. Dimensional attributes involve the use of a key which is stored within the person record. This key references a metadata store that defines the attributes unique to that key. Dimensional attributes allow the system to roll up data about people at different levels of a hierarchy. For example, a known attribute may be a zip code. From the zip code, a user may be able to pull out information regarding city, state, and country. Dimensional attributes also allow drill down from higher levels into lower levels of the hierarchy. "Drill paths" can be used to define drill up and drill down relationships between otherwise disconnected dimensional attributes and to cut across the hierarchy of a dimension.

The system collects attributes into attribute sets such that each attribute belongs to one and only one attribute set. An attribute set will commonly group together attributes that are obtained from a single source. For example, an attribute set might contain all of the attributes available about Facebook™ users. Each attribute set is stored in a data structure. This structure could be a table in a database, a set of rows connected by a common key in a key-name-value store, or as a semi-structured binary representation (such as xml or json). Furthermore, these attribute sets can be distributed across multiple data stores for purposes of redundancy, availability, and performance. Relationships describe the links between people and attribute sets. An example of such a relationship is "is a facebook user". It relates a person within the system to the attributes about that person sourced from Facebook.

The database of the present disclosure may include a relationships capability. Relationships may be used to tie attribute sets to addresses. For example, a user might associate an anonymous page view of a web site with the IP address of the viewer. An attribute set could be created that stores the attributes tied to an IP address such as user agent, IP Address, cookie data, location, and the viewer's locale. Attribute sets that are linked to addresses may also be linked to all the persons tied to the addresses.

In order to select a group of recipients for a messaging campaign, a user will typically need to generate a list based upon the attributes in the database.

Lists that are used to describe the targets for a message are called audiences. Audiences are lists of people and or addresses. Metadata tied to the audience defines the attributes sets available to messages intended for the audience. The audience's associations between people, addresses, and attributes sets are used to define the context of the send. The attribute sets tied to an audience are determined based upon user preference, user permissions, and recipient preferences. The attribute sets tied to an audience represent the attributes that can be used to "safely" generate a message for a person. It should be noted that "safely" in this context typically means unlikely to give the recipient cause for feeling that his or her privacy has been invaded.

Each list provides a context for the people on the list. Certain information about a person on a list is available due to the person belonging to the list. In other words, for each list, there is a set of subscriber attributes that we know about each person on the list. These attributes are the List's Person Attributes. It should be noted that some lists may include an attribute regarding whether a potential recipient has opted-in to a campaign or otherwise would like to receive messages.

In at least one embodiment of the present disclosure, the database may be configured for attribute equivalence. Attribute equivalence allows a user to specify that an attribute found in one context is equivalent to an attribute found in another context. For example, suppose Steve A and Stephen A are actually the same person but have separate profiles. Attribute equivalence may allow users to define an attribute (e.g., work address) of Steve A and Stephen A as being the same.

A person can have multiple attribute sets. User permissions, enterprise structure, delivery channel, policy, campaign, and the preferences of the recipient may determine which attribute sets that a user within the enterprise can access. The attribute sets available to the user who generates the message provides the context for the electronic message. Attributes that belong to attribute sets other than the ones within the context are not accessible for purposes of message generation. However, the context used for message generation can be different than the context for audience generation. For example, the system that generates overdraft notices for a bank will have access to attribute sets that contain very sensitive data such as Account Number and Account Balance. A user of the bank in the marketing department may want to send a promotional email for overdraft protection to people who have been overdrawn within the last year. The marketing user will require access to an attribute set that provides an indicator of the client having been overdrawn in order to develop the audience for this email. The marketing user will not require access to the attribute sets with sensitive data for targeting. Once the audience has been established, the marketing user no longer needs access to the attribute set with the overdraft indicator. So this attribute set will not be included in the context used for general sending of other messages. In this way, the attribute information can benefit the Business Units while still maintaining privacy for the individual.

A person may be tied to multiple attribute sets. In general, a person will always be accessible by the system within a specific context that defines what is known about that person within that context. There may be several levels of context. For example, there may be a public data context that contains all of the attribute sets that can be derived from publicly available data sources and a universal context that defines what information about a person is available to users within the system. The universal context can include public data attribute sets based upon configuration and user preference. An enterprise context may define the attributes of the people that are available throughout the enterprise. A business unit context may define the attributes of people that are available to users of that business unit. A campaign context may define the attributes of people included within the campaign. It should be noted that each of these contexts can have sub-contexts based upon intent. For example, the enterprise context can have sub-contexts of analytic enterprise context and a message generation enterprise context.

A few attributes may be tied to a particular context. For example, the universal context may include, for example, the subscriber key, created date, status, source, and linkedto. "Subscriber key" may be a unique identifier assigned to, for example, the person by a company or the system. "Created date" may be when the person entered the system. "Status" can be "Active", "Inactive", and "Linked". The "Active" and "Inactive" statuses can be used to indicate whether users can interact with the person or not. "Source" may define the manner in which the user was added to the system. In addition to this simple Source field, the system may also maintain a record of all the ways that a user is brought into the system.

In one embodiment of the present disclosure, a person with a status of "linked" may be consolidated with another person in the system. For example, suppose that Joe is a person in the system who receives emails and we have Joe's email address as well as his person key. There is another person in the system known as "Mystery Man" who interacted with the system via a mobile originated message. At some point, it is discovered that Mystery Man is in fact Joe. Both may be linked together by setting Mystery Man's status to "Linked" and LinkedTo to point at Joe. Typically, user defined attributes cannot be added to the universe.

Filtered audiences are lists that are created from other lists based upon a set of rules. A segment is a list that is created from one or more source list(s) based upon a formula. This could be a simple subset (all persons on the source list who have red hair). It could be a subset based upon related tables (all persons on the source list who have red hair and have clicked within the last two weeks). Segments can also be created from the union (all persons on list A with red hair and all persons on list B and wear glasses) or intersection (all persons on list A with red hair who also are on list B and wear glasses) of the source lists. Segments can also be created by randomizing functions. Segmentation rules can include a mixture of attribute filters and randomizing. For example, a segment could be created containing a random sample of 100 people who have red hear and wear glasses. Segments have no attributes of their own, but all the attributes defined in the source lists is visible within the segment. If an attribute is added to a segment source list after the segment was generated, the new attribute is visible within the segment. Segments typically do not support imports.

In one embodiment of the disclosed system and method, a user interface generated by the server 40 allows enterprises to manage information regarding subscribers, including the generation of lists. Enterprises can create as many or as few lists as necessary by interacting with the user interface. Enterprises can add subscribers to a list manually (individually) or by importing a collection of subscribers to a given list. When enterprises wish to have an ESP send emails on their behalf as part of an email marketing campaign, the enterprise can choose the recipients by selecting the appropriate lists and/or groups.

The system of the present disclosure allows the enterprise to filter the "All Subscribers" list available to the enterprise level users so that only subscribers that meet the defined filter criteria are displayed to business unit level users. Administrators interacting via an administrator device with the User Interface generated by the server may be provided with an action presented on a business unit listing page to allow the user to define the subscriber filter for a Business Unit. In other words, the user can set the filter criteria for the specified Business Unit. It should be noted that the user may define context via permissions or rules to allow different users to view and interact with only some or all of the information or attributes associated with each person.

As noted previously, enterprises often utilize an Email service provider (ESP), a company providing Email services, to carry out their Email marketing campaigns. ESPs often offer many services that permit an enterprise to conduct effective Email marketing campaigns. Some ESPs such as, for example, ExactTarget, LLC, provide toolsets to enterprises that include: content creation tools; personalization, segmentation, and viral marketing tools; underlying technology and deliverability tools; tools facilitating data transfer between the ESP's system and database and other business systems of the enterprise; tracking and graphical reporting tools and management tools allowing account administrator control, customization, and configuration.

To facilitate implementing an Email campaign, the enterprise will typically provide the ESP with an address or subscriber list of persons or entities that should be presented with Emails contained in the Email campaigns. This subscriber list may be in the form of a database including names, Email addresses and other demographic or business related information regarding each potential recipient.

Figure 2:
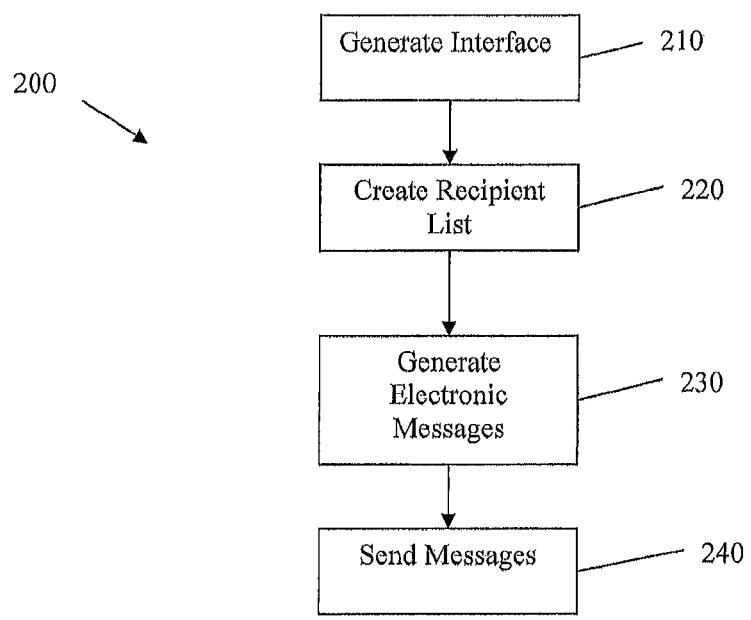
FIG. 2 shows a method for managing a messaging campaign within an enterprise according to at least one embodiment of the present disclosure.

FIG. 2 shows a method of managing a campaign and sending electronic messages 200. As shown in FIG. 2, the method 200 includes the step 210 of generating with a server a user interface, where the interface is configured to allow a user to select a recipient list based upon one or more attributes within a particular context stored in a database. The contextual attributes are based upon the interaction of one or more recipients with external systems. In FIG. 2, the method 200 also includes the step 220 of selecting a recipient list using the user interface based upon a set of contextual attributes and the step 230 of generating electronic messages within a message campaign. The method 200 also includes the step 240 of sending the electronic messages to recipients on the recipient list.

Figure 3:
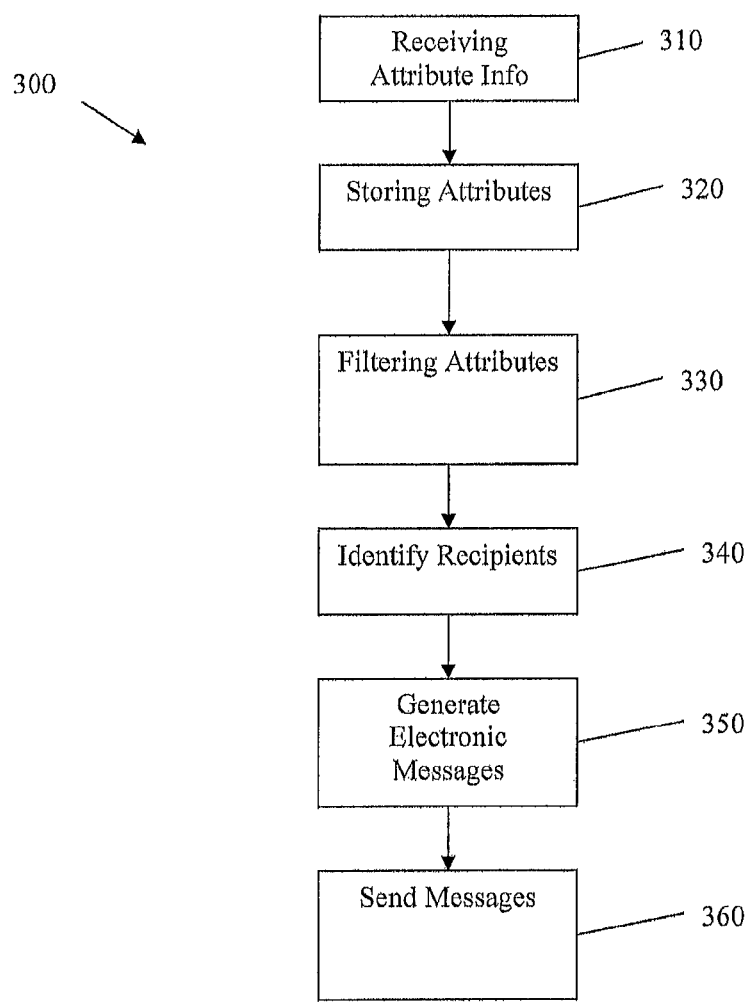
FIG. 3 shows a method for managing a messaging campaign within an enterprise according to at least one embodiment of the present disclosure.

FIG. 3 shows a method of arranging attributes within various contexts and sending electronic messages to recipients selected based on the attributes 300. As shown in FIG. 3, the method 300 includes the step 310 of receiving attribute information. The method 310 includes the step 320 of storing at least a portion of the attribute information based upon the interaction of a corresponding subscriber with external systems. The method 300 further includes the step 330 of filtering the stored attribute information within a context and the step 340 of identifying recipients based upon the filtering of the attributes. The method 300 also includes the step 350 of generating electronic messages and the step 360 of sending the electronic messages to the identified recipients.

Figure 4:
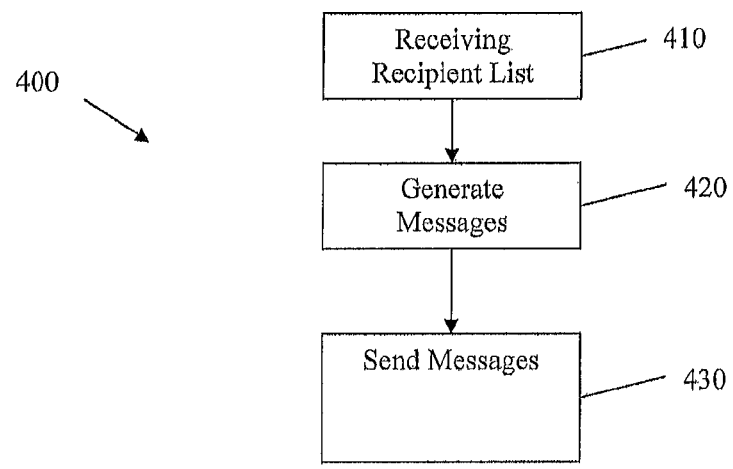
FIG. 4 shows a method for managing a messaging campaign within an enterprise according to at least one embodiment of the present disclosure.

FIG. 4 shows a method of managing a messaging campaign 400. As shown in FIG. 4, the method 400 includes the step 410 of receiving a recipient list based upon the filtering of a database with attributes within a context that describe the corresponding recipient's interaction with external systems. The method 400 also includes the step 420 of generating electronic messages and the step 430 of sending the electronic messages to the subscribers identified on the list.

Figure 5:
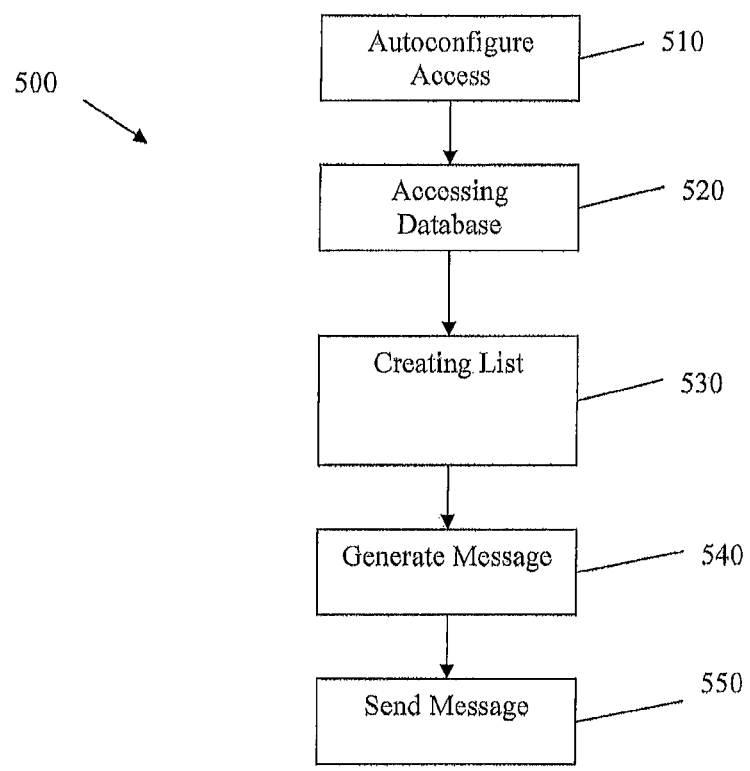
FIG. 5 shows a method for managing a messaging campaign within an enterprise according to at least one embodiment of the present disclosure.

FIG. 5 shows a method of managing a messaging campaign 500. As shown in FIG. 5, the method includes the step 510 of autoconfiguring access to attributes of a database to determine a plurality of contexts. It should be noted that autoconfiguring access to attributes of a database generally refers to automatically selecting the attributes and corresponding information that particular users can access. This configuration may be based upon a variety of factors, including privacy concerns. Of course, the access to attributes of a database may also be done by a user. The method 500 also includes the step 520 of accessing attributes of a database within one of the plurality of contexts and the step 530 of creating a list of recipients by selecting attributes within the one of the plurality of contexts. The method 500 further includes the step 540 of generating electronic messages and the step 550 of sending the electronic messages to the subscribers identified on the list.

The disclosed system and method facilitates management of subscriber information and access to such information in a more efficient manner across the enterprise including all of the business units of the enterprise. In one example of managing subscribers across an enterprise comprising multiple business units, a database 42 including all subscribers to one or more campaigns of the enterprise is maintained at, or only fully accessible to, the enterprise only at the enterprise, top or corporate level business unit.

Although some embodiments of the system and method of the present disclosure have generally focused on implementations wherein an enterprise utilizes an Email Service Provider to send Email messages on behalf of the enterprise, it is within the scope of the disclosure for other forms of electronic messaging to be sent based on contextual attributes. It is also noted that those portions of the system indicated as being portions of the ESP subsystem may be implemented within the enterprise system.

While this disclosure has been described as having various embodiments, these embodiments according to the present disclosure can be further modified within the scope and spirit of this disclosure. This application is therefore intended to cover any variations, uses, or adaptations of the disclosure using its general principles. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

That which is claimed is:

1. A method for sending an electronic communication within a message campaign to a plurality of recipients, the method comprising:
generating with a server, a user interface, the user interface being configured, based upon a predetermined context assigned to a first user, to allow the first user to select a recipient list based upon one or more attributes of potential recipients within the predetermined context, wherein the predetermined context is selected from a plurality of contexts stored in a database, wherein each context stored in the database comprises a set of attributes made available to one or more users, wherein an attribute of the one or more attributes comprises an online social influence rating, and wherein the first user is restricted from viewing attributes of potential recipients outside the predetermined context;
creating a recipient list using the user interface by selecting among the one or more attributes, wherein selecting among the one or more attributes comprises randomly sampling from the potential recipients within the predetermined context that have the online social influence rating;
generating electronic messages within a message campaign;
sending the electronic messages to recipients on the recipient list;
in response to sending the electronic messages to the recipients on the recipient list, generating a new context comprising a new set of attributes, the new set of attributes comprising the attributes of the predetermined context other than the selected one or more attributes; and
automatically assigning the new context to the first user,
wherein the new context restricts the first user from accessing attributes of potential recipients other than the new set of attributes,
wherein the new set of attributes comprises at least one attribute linked to a particular potential recipient, and
wherein substantially all attributes of the new set of attributes that are linked to the particular potential recipient maintain the privacy of the particular potential recipient.

2. The method of claim 1, wherein the electronic messages comprise email.

3. The method of claim 1, wherein the electronic messages comprise short message service (sms) messages.

4. The method of claim 1, further comprising receiving the recipient list.

5. The method of claim 4, wherein the one or more attributes comprise an attribute of a social media communication.

6. The method of claim 5, wherein the social media communication comprises a post on a website.

7. The method of claim 1, further comprising autoconfiguring access to the one or more attributes within the context.

8. The method of claim 1, wherein the set of attributes are made available to one or more users based on at least one selected from the group consisting of user permissions, enterprise structure, delivery channel, policy, campaign, and the preferences of a recipient.

9. The method of claim 1, wherein the predetermined context is assigned to the user based on the user's permissions.

10. The method of claim 1,
wherein the predetermined context comprises attributes that are selected based on rules comprising an attribute filter.

11. The method of claim 1,
wherein the predetermined context comprises attributes that are selected based on rules comprising an attribute filter; and
wherein the attribute filter is configured to filter based on criteria comprising a preference of a recipient, an enterprise structure, and a permission of the first user.

12. The method of claim 1,
wherein the predetermined context comprises attributes that are selected based on rules comprising an attribute filter;
wherein the attribute filter is configured to filter based on criteria comprising a preference of a recipient, an enterprise structure, and a permission of the first user; and
wherein an attribute of the one or more attributes is based on an interaction of a recipient with an external system.

13. A method for sending an electronic communication within a message campaign to a plurality of recipients, the method comprising:
receiving, at a server, a recipient list based upon one or more selected attributes of potential recipients within a predetermined context assigned to a first user, wherein an attribute of the one or more selected attributes comprises an online social influence rating, wherein the predetermined context is selected from a plurality of contexts stored in a database, wherein each context stored in the database comprises a set of attributes of potential recipients made available to one or more users, wherein the recipient list is selected based upon a random sample from the potential recipients within the predetermined context that have the online social influence rating, and wherein the first user is restricted from viewing attributes of potential recipients outside the predetermined context;
generating electronic messages within a message campaign;
sending the electronic messages to recipients on the recipient list;
in response to sending the electronic messages to the recipients on the recipient list, generating a new context comprising a new set of attributes, the new set of attributes comprising the attributes of the predetermined context other than the selected one or more attributes; and
automatically assigning the new context to the first user,
wherein the new context restricts the first user from accessing attributes of potential recipients other than the new set of attributes,
wherein the new set of attributes comprises at least one attribute linked to a particular potential recipient, and
wherein substantially all attributes of the new set of attributes that are linked to the particular potential recipient maintain the privacy of the particular potential recipient.

14. The method of claim 13, wherein the electronic messages comprise e-mail.

15. The method of claim 13, wherein the electronic messages comprise short message service (sms) messages.

16. The method of claim 13, wherein the one or more attributes comprise an attribute of a social media communication.

17. The method of claim 16, wherein the social media communication comprises a post on a website.

18. The method of claim 13, further comprising autoconfiguring access to the one or more attributes within the context.

19. A system for sending an electronic communication within a message campaign to a plurality of recipients, the system comprising:
an electronic message provider configured to generate and send one or more electronic messages, the electronic message provider comprising a server for generating a user interface, the user interface being configured to:
allow, based upon a predetermined context assigned to a first user, the first user to select a recipient list based upon a selection by the first user of one or more attributes of potential recipients within the predetermined context,
wherein the predetermined context is selected from a plurality of contexts stored in a database,
wherein each context stored in the database comprises a set of attributes made available to one or more users,
wherein an attribute of the one or more attributes comprises an online social influence rating,
wherein the selection by the first user of the recipient list comprises a random sample from the potential recipients within the predetermined context that have the online social influence rating, and
wherein the first user is restricted from viewing attributes of potential recipients outside the predetermined context,
generate electronic messages within a message campaign, send the electronic messages to recipients on the recipient list, in response to sending the electronic messages to the recipients on the recipient list, generate a new context comprising a new set of attributes, the new set of attributes comprising the attributes of the predetermined context other than the one or more attributes selected by the first user, and automatically assign the new context to the first user,
wherein the new context restricts the first user from accessing attributes of potential recipients other than the new set of attributes,
wherein the new set of attributes comprises at least one attribute linked to a particular potential recipient, and
wherein substantially all attributes of the new set of attributes that are linked to the particular potential recipient maintain the privacy of the particular potential recipient; and
at least one enterprise system connected to the server through a network, wherein the at least one enterprise system is configured to display the user interface.

20. The system of claim 19, wherein the electronic messages comprise e-mail.

21. The system of claim 19, wherein the electronic messages comprise short message service (sms) messages.

22. The system of claim 19, wherein the one or more attributes comprise an attribute of a social media communication.

23. The system of claim 22, wherein the social media communication comprises a post on a website.

* * * * *